June 16, 1931.  B. N. SOKOLOFF  1,810,539
METHOD OF AND APPARATUS FOR AMPLIFYING WEAK ELECTRIC CURRENTS
Filed Aug. 16, 1926  2 Sheets-Sheet 1
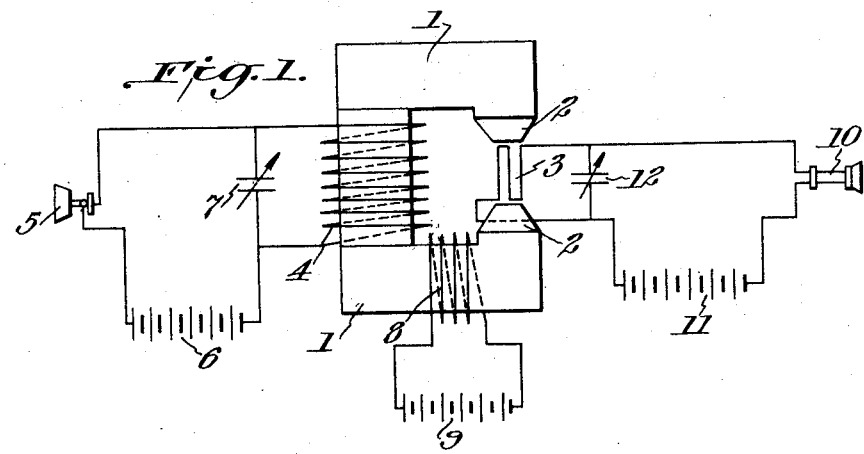
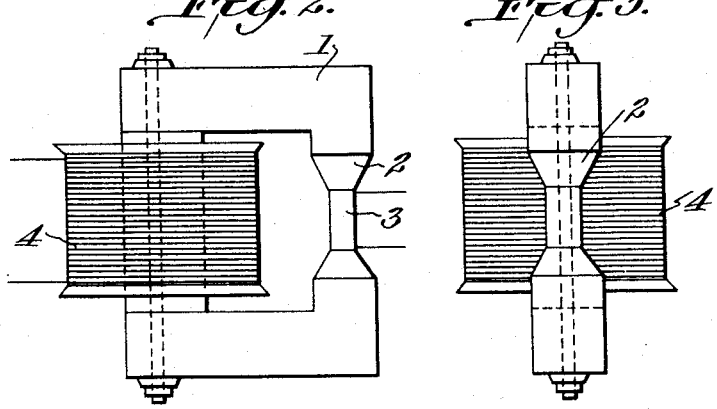
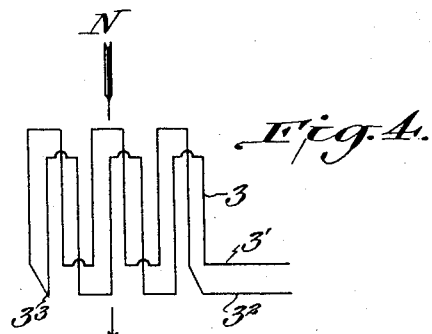
Inventor:
Boris N. Sokoloff,
By Byrnes Townsend & Brickenstein,
Attorneys.

June 16, 1931.   B. N. SOKOLOFF   1,810,539
METHOD OF AND APPARATUS FOR AMPLIFYING WEAK ELECTRIC CURRENTS
Filed Aug. 16, 1926    2 Sheets-Sheet 2

Inventor:
Boris N. Sokoloff,
By Byrnes Townsend Brickenstein,
Attorneys.

Patented June 16, 1931

1,810,539

UNITED STATES PATENT OFFICE

BORIS N. SOKOLOFF, OF ROSENDALE, NEW YORK, ASSIGNOR TO FEDERAL TELEGRAPH COMPANY, OF SAN FRANCISCO, CALIFORNIA, A CORPORATION OF CALIFORNIA

METHOD OF AND APPARATUS FOR AMPLIFYING WEAK ELECTRIC CURRENTS

Application filed August 16, 1926. Serial No. 129,546.

This invention relates to the amplification of relatively weak electric currents and particularly to that class of amplifiers wherein the variations in ohmic resistance of a conductor due to variations in a surrounding magnetic field, are used to vary a current through the conductor. It is well known that certain metals such as iron, nickel, bismuth, and many others, change their ohmic resistance due to changes in a magnetic field. It has been proposed to cause the variations in the magnetic field by a relatively weak electric current to be amplified and utilize the changes in resistance of a sensitive conductor to vary a current flow therein. One embodiment of such an amplifier is shown and described in my application 591,347; filed September 9, 1922, now Patent 1,596,558, dated August 7, 1926 for method and apparatus for amplifying electric currents, of which this application is an improvement.

An object of my invention is to provide an improved method and apparatus accomplishing such amplification in a simple, effective and efficient manner.

A further object is to utilize the variations in ohmic resistance of a conductor due to variations in a surrounding magnetic field in a more efficient manner.

Another object is to provide a more efficient and sensitive conductor of that type whose resistance varies with changes in a surrounding magnetic field.

These and other objects will be apparent from the following description wherein

Fig. 1 is a diagram of electric and magnetic connections of an amplifier to which my invention has been applied.

Fig. 2 is an elevation of a portion of my apparatus.

Fig. 3 is a side view thereof.

Fig. 4 is a diagrammatic showing of my sensitive conductor.

Figure 5:
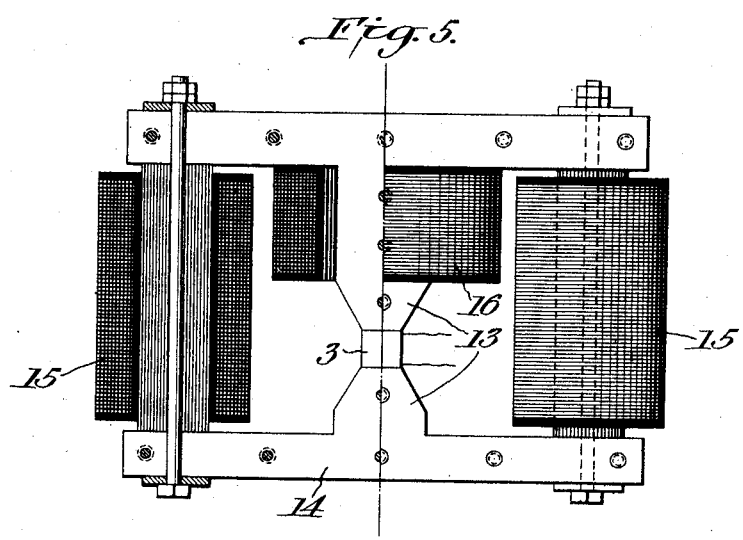
Fig. 5 is a view, partly in section, of a modified form of magnet structure.

Fig. 1 shows a magnetic amplifier to which my invention is applied. The connections are shown for a telephone circuit, although any other suitable circuit may be used, such as in wireless telephone or telegraph apparatus, or any electric circuits wherein relatively weak currents need to be amplified. The essential parts of the amplifier are the magnet made up of yoke 1, having tapering pole faces 2—2, in the air-gap between which is placed a sensitive conductor 3. A coil 4 is wound around one leg of yoke 1, this coil carrying the current to be amplified. This coil is connected to a circuit including a microphone 5 and battery 6, and shunted by a variable condenser 7. This condenser is not essential to my invention but is frequently desirable in order to eliminate the high-frequency currents produced by self-induction in this circuit.

Also wound on yoke 1 is a second coil 8 connected to a suitable source of current, shown in this case as battery 9. This coil is provided in order that magnet yoke 1 may carry a constant flux, on which a variable flux produced by the current to be amplified is superimposed. It is understood that I may secure the constant flux necessary in magnet 1 by making the same a permanent magnet, though in the present case I show winding 8 for this purpose, but either method may be used. However, the presence of a constant flux is an essential of my invention, upon which the variable flux is superimposed. By this means the flux density which is effective to influence the sensitive conductor 3 is materially raised to a higher level. It is a well established fact that the variations in ohmic resistance of an electrical conductor under influence of a magnetic field show a marked increase only after a certain absolute value of flux is reached. For nickel, cobalt and iron these variations begin to markedly increase after a flux of 1000 c. g. s. units appear; on the other hand the current to be amplified is frequently so weak that it is impracticable to produce a flux of such a high value. By means of my improvement, the flux density may be raised to the point of maximum efficiency, and the flux produced by the relatively weak current then superimposed thereon.

In order to further increase the density of flux acting upon the sensitive conductor 3, the pole faces 2 are shown as tapered, thus concentrating the flux density.

The sensitive conductor 3 is connected to a telephone receiver or loud speaker or repeater 10, and to a battery 11, there being a variable condenser 12 shunted across this circuit.

With the connections as shown, the variations in current in the microphone 5 produces variations in current in coil 4; these variations cause a variable flux to be superimposed on the constant flux already present in yoke 1; under the influence of variations in flux of high density the ohmic resistance of conductor 3 undergoes corresponding changes, to thus vary the value of electric current passing through to telephone receiver 10.

By suitably selecting the resistances of windings 4, microphone 5, conductor 3 and receiver 10, the number of turns in winding 4 and the electro-motive force in the two circuits, weak currents produced in the microphone circuit may be amplified in the receiver circuit, providing suitable materials are chosen for the magnet 1 and conductor 3. For the latter, bismuth, nickel, iron or cobalt are used but other metals and their alloys or minerals may be used.

To further improve the efficiency of the amplifier, a special arrangement of sensitive conductor is used.

The reluctivity of materials used for sensitive conductors is usually lower than air and therefore it is advantageous to have such arrangement of conductor as to present the minimum reluctance by increasing the active area of cross-section of the conductor disposed in the air-gap; on the other hand the ohmic resistance of the sensitive conductor must have a definite value to make the changes in resistance sufficiently high to affect the resistance of the secondary circuit, i. e. of the circuit carrying the amplified current to the receiver or other utilizing means. To achieve such improvement, according to this invention, the sensitive conductor is built such that its component parts are connected in parallel in relation to the flux and in series in relation to the amplified current. One arrangement of such a conductor is shown diagrammatically in Fig. 4. In this figure the arrow N—S shows the direction of the lines of flux. The conductor 3 is formed by taking a double conductor, formed of separate strands $3^1$ and $3^2$, joined at one end $3^3$ and bending the same alternately back and forth or in zig-zag form. The conductor is then placed in the air-gap such that the longer parallel parts thereof are parallel to the flux lines, as seen in Fig. 4.

Those parts of the conductor thus arranged parallel to the lines of force will change their ohmic resistance due to flux changes in the field, but no current will be induced in them, because they are not cut by lines of force; the parts of the conductor that are cut by lines of force will also vary their ohmic resistance, just as the parallel parts, and will also have currents induced therein. These induced currents, if allowed to flow, would unfavorably affect the receiver. By the design of my conductor, however, all induced currents are counter-balanced by equal and opposite currents induced in the conductor. The conductor is so made that the horizontal sections or those cut by lines of force are equal in length in section $3^1$ to those in $3^2$. Therefore, if current were induced to flow in one direction in section $3^1$, there would be induced an exactly equal and opposite current in section $3^2$, resulting in a balance.

It will be noted that with a sensitive conductor constructed according to this invention, the major part of the conductor acts as a medium for transmittal of flux between pole faces, thus preventing leakage and consequent loss of efficiency. The flux need jump an air-gap only slightly greater than twice the thickness of insulation around the conductor.

The mechanical construction of the invention is carried out in the following manner: The magnet yoke 1 is of solid or laminated iron or steel, with pole shoes 1 directly attached thereto. In constructing the sensitive conductor, a length and gauge of wire is selected according to calculation, is preliminarily insulated, such as by enamel, and then bent into shape with two free ends. The conductor is then pressed to form it to proper size and shape, placed in the air-gap and impregnated with molten insulation. The assembled apparatus is then tested and the free ends of the wire are wound around the finished conductor in one or opposite directions to give complete compensation for all induced currents.

Figure 6:
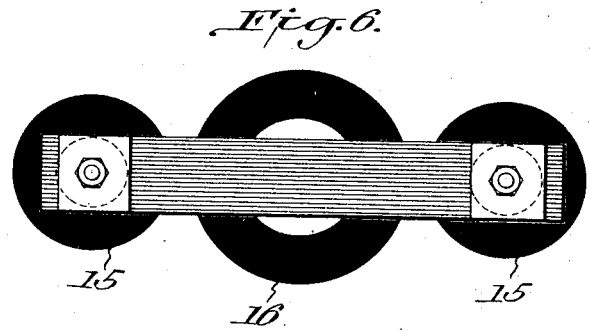
Fig. 6 is a horizontal section thereof.

In the modified form shown in Figs. 5 and 6, the sensitive conductor 3 is again placed between tapered pole shoes 13 of the magnet 14. In these views two polarizing magnet coils 15 are shown and the coil carrying the current to be amplified is marked 16. By this construction a higher concentration of flux is possible.

I claim:

1. In an electric current amplifying device, a pair of pole members, a magnetic circuit including a constant flux extending between said pole members and including a variable resistance conductor disposed between said pole pieces and in alignment therewith, the longitudinally extending portions of said conductor being aligned with the direction of magnetic flux between said pole pieces, two electric circuits, means connected in one electric circuit to produce changes in the magnetic circuit, said variable resistance conductor being included in the second electric circuit, whereby current changes in the first circuit are translated into magnetic changes in the magnetic circuit and into amplified current changes in the second circuit.

2. In an electric current amplifying device, a magnet having a constant flux and an air-gap of reduced cross-section to concentrate the same, a coil on said magnet included in a circuit traversed by the current to be amplified, a conductor in the field of said magnet whose ohmic resistance varies with the said field, said conductor having longitudinally extending portions which are aligned with the direction of magnetic flux through said gap, and an electric circuit including said variable-resistance conductor and a reproducer, whereby the current fluctuations to be amplified are multiplied and reproduced in the reproducer.

3. In an amplifying system, a pair of pole pieces directed toward each other, a magnetic circuit having a constant flux extending between said pole pieces, an electric circuit carrying currents to be amplified, means connected to said electric circuit to superimpose on said magnetic circuit a flux varying in response to the current changes in said electric circuit, a multi-section conductor composed of a sensitive resistance material disposed between said pole pieces and responsive to variations in said magnetic circuit, and a second electric circuit connected to said multi-section conductor and adapted to respond to resistance changes therein.

4. In an electric current amplifying device, a magnet provided with a winding through which the current to be amplified is passed, a second permanently-energized winding on said magnet, an air-gap in the magnet circuit, the pole faces of said magnet being contracted at said air-gap to provide a concentration of flux, a conductor disposed in said air-gap and having an ohmic resistance varient with the strength of field within which it is placed, said conductor having longitudinally extending portions which are aligned with the direction of magnetic flux in said air gap, and an electric circuit including said variable resistance conductor, a source of energy and current detecting means.

5. An amplifying device for electric currents comprising a pair of pole pieces directed toward each other and separated by a magnetic gap, an electromagnetic field for setting up magnetic lines of force across said gap, an independent field winding, means for impressing the current to be amplified upon said independent field winding for producing variations in the flux across said magnetic gap, a sensitive conductor positioned in said gap, said sensitive conductor having its component parts connected in parallel in relation to the flux, and in series in relation to the amplified electric current with the major components of said sensitive conductor extending in directions coincident with the direction of magnetic flux across said gap.

6. An amplifying device for electric currents comprising a pair of pole pieces directed toward each other and separated by a magnetic gap, an electromagnetic field for setting up magnetic lines of force across said magnetic gap, an independent field winding, means for impressing the current to be amplified upon said independent field winding for producing variations in the flux across said magnetic gap, a sensitive conductor positioned in said gap, said sensitive conductor being bent upon itself a plurality of times and disposed longitudinally of the lines of force extending between said pole pieces with portions of said sensitive conductor extending laterally of the gap for neutralizing in said sensitive conductor by equal and opposite induced currents, all currents induced therein by the surrounding field.

7. An amplifying device for electric currents comprising a pair of pole pieces directed toward each other and separated by a magnetic gap, an electro-magnetic field for setting up magnetic lines of force across said magnetic gap, an independent field winding, means for impressing the current to be amplified upon said independent field winding for producing variations in the flux across said magnetic gap, a sensitive conductor positioned in said gap, said sensitive conductor being bent upon itself within said gap a plurality of times and being constituted by longitudinally and laterally extending portions, with the longitudinally extending portions positioned in parallel relation to the flux and the laterally extending portions positioned in perpendicular relation to the flux and an output circuit connected in series with the portions of said sensitive conductor for conveying currents from said device increased in amplitude with respect to the currents impressed upon said independent field winding.

8. An electric current amplifying device of the type wherein variations in current in one circuit cause variations in a magnetic field to thereby change the resistance of a sensitive member placed therein, characterized by the fact that said sensitive member comprises two conductors joined at one end and bent back and forth to form a zig-zag coil, with short and long sections.

9. An electric current amplifying device of the type wherein variations in current in one circuit cause variations in a magnetic field to thereby change the resistance of a sensitive member placed therein, characterized by the fact that said sensitive member comprises two parallel conductors joined at one end and bent back and forth to form a zig-zag coil, with the conductors parallel and having short and long sections, said member being placed in the magnetic field with the long sections thereof in parallel relation to the flux, and connected in series for the passage of the amplified current.

10. The structure as in claim 8, wherein the short sections of the sensitive conductor extend transversely of the long sections and are cut by lines of force at each end of the sensitive member for inducing currents in one side of said member equal and opposite to currents in the other side of said member.

In testimony whereof, I affix my signature.

BORIS N. SOKOLOFF.